United States Patent [19]

Mizuta et al.

[11] Patent Number: 4,746,845
[45] Date of Patent: May 24, 1988

[54] CIRCUIT FOR PREVENTING THE ERRONEOUS OPERATION OF A MOTOR CONTROL DEVICE FOR LIFTING AND LOWERING A POWER WINDOW

[75] Inventors: Ken Mizuta; Shiro Kondo, both of Miyagi, Japan

[73] Assignee: Alps Electric Co., Ltd., Japan

[21] Appl. No.: 920,898

[22] Filed: Oct. 16, 1986

Related U.S. Application Data

[63] Continuation-in-part of Ser. No. 760,470, Jul. 30, 1985, abandoned.

[30] Foreign Application Priority Data

Jul. 30, 1984 [JP] Japan .................................. 59-157298

[51] Int. Cl.$^4$ ............................................. H02P 1/22
[52] U.S. Cl. ...................................... 318/286; 318/266; 318/469
[58] Field of Search .................... 49/26, 28; 318/256, 318/264, 265, 266, 267, 282, 286, 319, 450, 466, 468, 285, 434, 452, 469, 470

[56] References Cited

U.S. PATENT DOCUMENTS

| 4,220,900 | 9/1980 | Mintz | 318/450 X |
| 4,533,901 | 8/1985 | Lederle | 49/28 X |
| 4,561,691 | 12/1985 | Kawai et al. | 49/28 X |
| 4,563,623 | 1/1986 | Matsuka | 318/319 X |
| 4,628,234 | 12/1986 | Mizuta et al. | 318/267 |
| 4,641,067 | 2/1987 | Iizawa et al. | 49/28 X |

*Primary Examiner*—Bentsu Ro
*Attorney, Agent, or Firm*—Guy W. Shoup

[57] ABSTRACT

An automatic window regulator for automobiles includes a drive motor for lifting and lowering the window glass, and a detector for detecting when there is a foreign object jammed between the window glass as it is lifted or lowered and a window frame. The detector includes sensor means for measuring motor characteristic values of the drive motor and comparator means for comparing a first motor characteristic value measured by the sensor means with a second motor characteristic value measured by the sensor means a prescribed period of time prior to the first motor characteristic value and for generating a detected signal indicative of the jammed foreign object when any difference between the compared first and second motor characteristic values is greater than a predetermined range.

5 Claims, 4 Drawing Sheets

Fig.4(D),(E)

CIRCUIT FOR PREVENTING THE ERRONEOUS OPERATION OF A MOTOR CONTROL DEVICE FOR LIFTING AND LOWERING A POWER WINDOW

This is a continuation-in-part application from application Ser. No. 760,470 filed July 30, 1985, now abandoned.

BACKGROUND OF THE INVENTION

The present invention relates to a device for an automatic window winder for automatically lifting and lowering a window glass, and more particularly to a jam detector means for detecting a foreign object jammed between a window frame and the window glass when the latter is moving.

Heretofore, window glass in automobiles has been moved up and down by rotating a crank operatively coupled to the window glass. To eliminate this tedious and time-consuming operation of the crank, there have been proposed and used in recent years various automatic window winders known as "power window regulators" especially in expensive cars.

One example of such automatic window winders includes a reversible driver motor (hereinafter called "motor"), a changeover switch for lifting or lowering the window glass, and two one-shot multivibrator circuits. Each of the one shot multivibrator circuits energizes the motor for a fixed period of time with a trigger pulse for lifting or lowering the window glass.

With the above automatic window regulator, however, the motor is energized for the fixed period of time irrespectively of the position of the window glass prior to being moved. Therefore, the motor will continue to rotate after an upper edge of the window glass hits the window frame and the motor is abruptly stopped if the window glass starts moving upwardly from a partly-open position. The same condition holds true when the window glass is to be lowered. Such forced stoppage of the window glass, if repeated, will shorten the service life of the motor.

When a passenger's hand or neck or another body part happens to be jammed between the window glass and the window frame while the window glass is moving upwardly, the jammed body part is continuously pinched until the motor is de-energized. This is quite dangerous as the pinched hand or neck is highly likely to get injured.

To remove the above shortcoming, there have been proposed various power window regulators having means for detecting a foreign object jammed between the window glass and the window frame upon movement of the window glass.

FIG. 5 of the accompanying drawings illustrates the waveform of current flowing through the motor when it moves the window glass. Designated at (a) is the current flowing when the motor is started, (b) the current flowing when the motor is rotating normally, and (c) the current flowing when the window glass is blocked by a jam. As shown in FIG. 5, the motor current becomes abruptly higher upon locking of the window glass than when the motor operates normally. Based on this characteristic curve, there has been employed a method of cutting off the motor current when the motor current exceeds a reference level whereupon the jam detecting means determines that the window is locked. Since, however, the motor current rises sharply both when it is started and when the window glass is locked, it is necessary to provide a means for discriminating the window locking from the motor starting, resulting in a complex circuit arrangement.

Another method of cutting off the motor current is to monitor the rotational speed of the motor and detects a reduction of the motor speed at the time the window glass is locked, the motor current being cut off by a detected signal indicative of such a speed reduction.

According to each of the speed and current detecting methods, as described above, an absolute quantity is measured and a window-locked condition is determined when the measured absolute quantity deviates from a reference level to stop the motor. However, the motor current or speed is liable to undergo variations due to warpage of the window frame, a change in ambient temperature, and a discharge-induced voltage drop across the car-mounted battery. The reference level for determining whether the window glass is locked or not has to be set to a considerably high level for the motor current or to a considerably low level for the motor speed. This level setting fails to provide sufficient safety.

SUMMARY OF THE INVENTION

With the foregoing prior difficulties in view, it is an object of the present invention to provide a device for automatically lifting and lowering window glass with safety without being affected by emvironmetal conditions such as warpage of a window frame, a change in ambient temperature, and a discharge-induced voltage drop across a car-mounted battery.

To achieve the above object, a device for automatically lifting and lowering window glass includes a drive motor for lifting and lowering the window glass and a detecting means for detecting part of a human body or any other foreign object jammed between the window glass and a window frame while the window glass is moving upwardly or downwardly. The detecting means has a sensor means for measuring a motor characteristic such for example as a voltage, a current, or a rotational speed of the motor as it is energized, and a comparator means for comparing values of such a motor characteristic. The comparator means compares the value of a motor characteristic measured by the sensor means and the value of a motor characteristic measured by the sensor means a predetermined period of time prior to the former motor characteristic. If the difference between the compared values is greater than a prescribed range, then the detecting means generates a detected signal indicative of a jam.

For attaining the foregoing object, the feature of the present invention resides in a circuit for preventing the erroneous operation of a motor control device for lifting and lowering a power window having a drive motor for lifting and lowering the window glass, means for detecting when any foreign matter is caught between the window glass and a window frame when the window glass is lifted and lowered, wherein the detecting means includes sensor means for measuring characteristic values of the drive motor based on the load torque relative to supplied current and comparator means for comparing the motor characteristic values with each other, in which the motor characteristic value measured by the sensor means and a motor characteristic value measured a predetermined of time before the current motor characteristic value are compared by the comparator means and a foreign matter detection signal is output if a difference value as the result of the comparison is greater than a predetermined range, and means for preventing the output of the foreign matter detection signal for a predetermined of time upon operation of an actuation switch for the drive motor.

BRIEF DESCRIPTION OF THE DRAWINGS

FIGS. 4(A)-4(E) are diagrams showing the waveforms of voltages at various points in the detecting circuit at the time of energizing a motor.

DESCRIPTION OF THE PREFERRED EMBODIMENT

Figure 2:
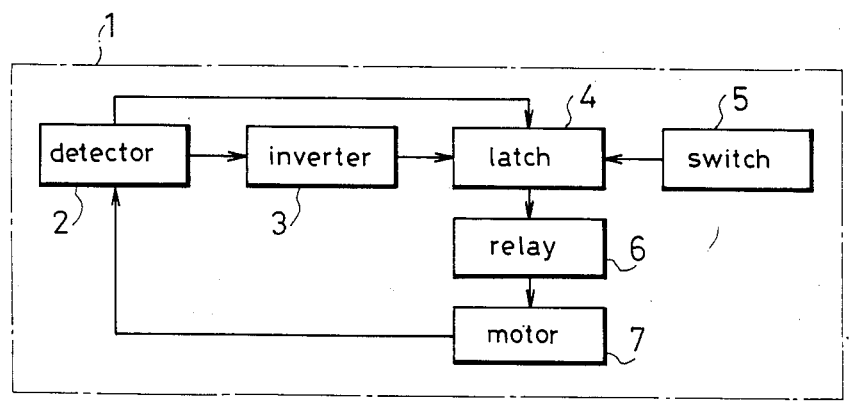
FIG. 2 is a block diagram of the automatic window glass regulator.

FIG. 2 shows an overall arrangement of an automatic window glass regulator according to the present invention. The automatic window glass regulator, generally designated at 1, includes a detector 2, a reversing circuit (inverter) 3, a latching circuit 4, a switch 5, a relay 6, and a motor 7.

These components of the automatic window glass regulator will now be described as to their functions.

Detector 2:

When a hand or neck is pinched between window glass and a window frame while the window glass is moving upwardly and positioned short of the window frame, the detector 2 detects such a jam. The detailed circuit arrangement and operation of the detector 2 will be described in detail later on.

Reversing circuit 3:

When a hand or any other foreign object is jammed between the window frame and the window glass as the latter moves upwardly, a detected signal from the detector 2 is applied to the reversing circuit 3 to release a hold condition of the latch 4 for thereby reversing the motor 7 to lower the window glass. When the window glass reaches a lowermost position, the reversing circuit 3 stops the rotation of the motor 7.

Figure 3:
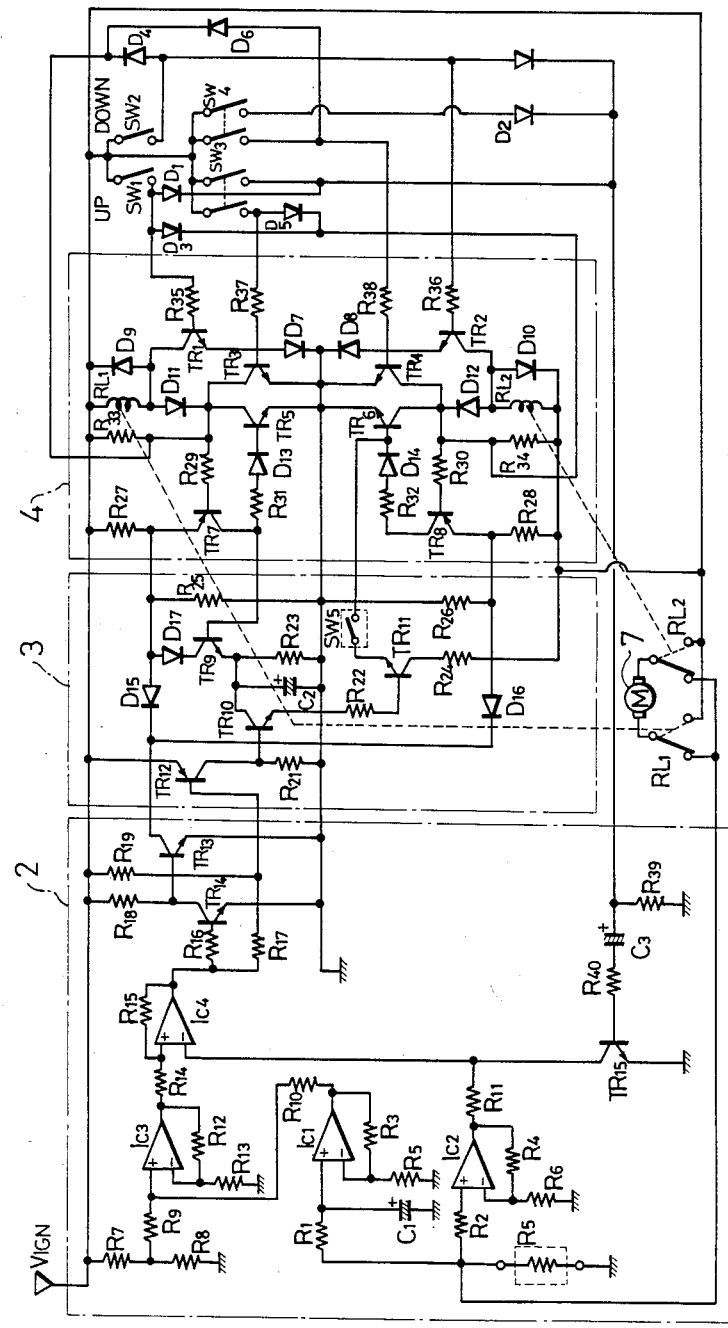
FIG. 3 is an electric circuit diagram of the automatic window glass regulator.

Whether the window glass reaches the upper window frame or not upon lifting is detected by a position detection switch SW5 (refer to FIG. 3). That is, the position detection switch SW5 is put to ON when the window glass has not reached the upper window frame and if a detection signal is inputted from the detection circuit 2, the rotation of the motor 7 is reversed by the AND condition established therewith. While on the other hand, when the position detection switch SW5 is turned OFF and the detection signal from the detection circuit 2 is inputted, the rotation of the motor 7 is interrupted by the AND condition. Accordingly, the position detection switch SW5 is desirably disposed in the lifting and lowering passage of the window glass or the support member for supporting the same such as in the vicinity of the upper window frame.

Latching circuit 4:

The circuit has a function of holding the current supply state to the motor 7 in view of the circuit structure if the input is applied even by one pulse from the automatic switches SW3 and SW4 (refer to FIG. 3) for automatic opening and closing. However, it is adapted such that when the motor 7 is locked and the detection circuit 2 is actuated, the holding is directly released.

Figure 1:
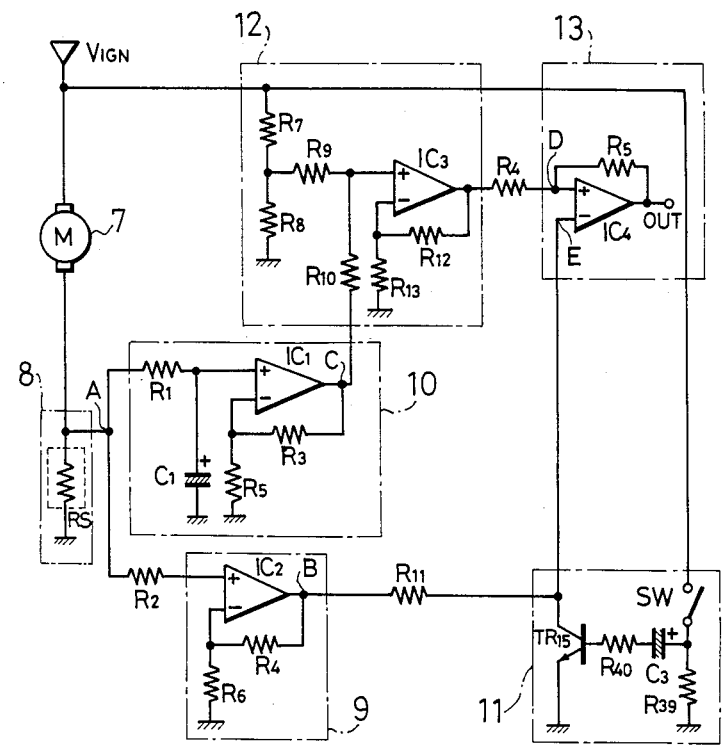
FIG. 1 is an electric current diagram of a detecting circuit in an automatic window glass regulator according to the present invention.

FIG. 1 is illustrative of an electric circuit arrangement of the detector 2. The detector 2 is primarily composed of a motor waveform sensor 8, a real-time amplifier circuit 9, a delay amplifier circuit 10, a starting voltage cancelling circuit 11, a noninverting adding amplifier circuit 12, and a comparator 13.

Figure 4A:
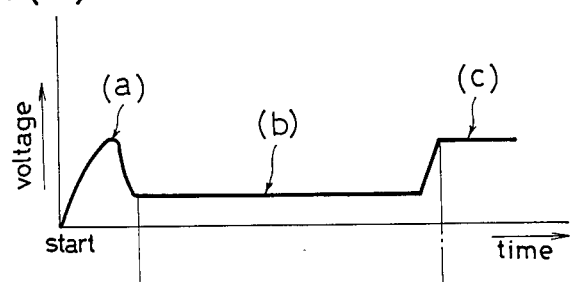

The motor waveform sensor 8 shown in FIG. 1 comprises a resistor $R_S$ for converting a current flowing through the motor 7 into a voltage. The resistor $R_S$ produces a voltage waveform as shown in FIG. 4(A) thereacross.

Figure 4B:
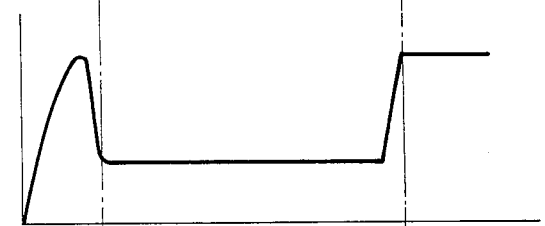

The real-time amplifier circuit 9 amplifies the voltage across the resistor R at a magnification of $(1+R4/R6)$, and produces an output waveform as shown in FIG. 4(B).

Figure 4C:
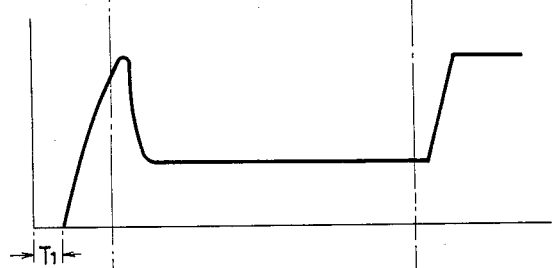
Figure 4C:
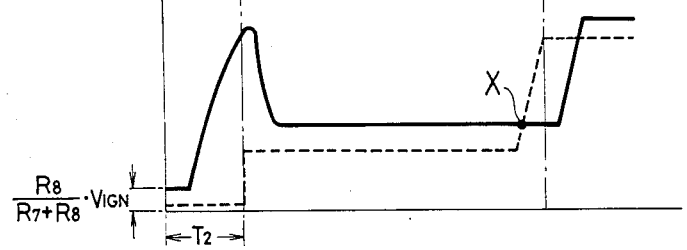
Figure 5:
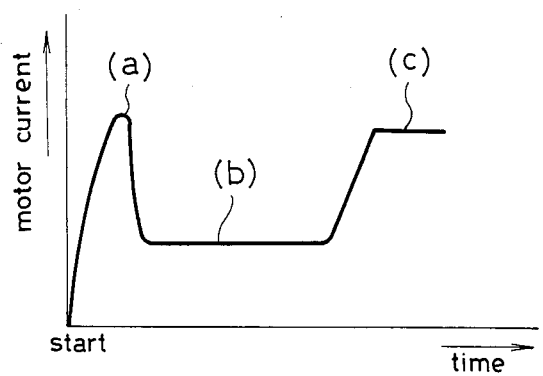
FIG. 5 is a diagram of the motor current waveform explanatory of a conventional jam detecting means.

The delay amplifier circuit 10 is employed to delay the voltage produced across the resistor RS for a time $T_1$ determined by a capacitor C1 and a resistor R1 and to amplify the delayed voltage at a magnification of $(1+R3/R5)$. The delay amplifier circuit 10 produces an output waveform as shown in FIG. 4(C).

The starting voltage cancelling circuit 11 serves to forcedly turn the transistor TR15 to ON by a time $T_2$ determined by the capacitor C3 and the resistor $R_{39}$ to cancel the voltage upon starting when at least one of the switches SW1-SW4 shown in FIG. 3 is operated to ON. As shown by the dotted line in FIGS. 4(D), (E), an output waveform can be obtained in which the output is cancelled from the start to the time $T_2$.

Further the circuit is connected such that, in the case where window glass lifting switches SW, that is, SW1 and SW3, as well as window glass lowering switches SW, that is, SW2 and SW4 shown in FIG. 3 are simultaneously turned ON, current flows from the window glass lowering switches SW by way of diodes D4, D6 to the collectors of transistors TR3, TR5, while a current flows from the window glass lifting SW by way of diodes D3, D5 to the collectors of the transistors TR4, TR6, so that the motor 7 cannot rotate.

The noninverting adding amplifier circuit 12 issues an output which is the sum of the output voltage from the delay amplifier circuit 10 and a voltage defined by $\{R8/(R7+R8)\}V_{IGN}$, the output waveform of the noninverting adding amplifier circuit 12 being indicated by the solid line in FIGS. 4(D), (E).

The comparator 13 serves to compare the output voltage from the real-time amplifier circuit 9 through the starting voltage cancelling circuit 11 and the output voltage received from the noninverting adding amplifier circuit 12 at all times for thereby determining whether the motor 7 is locked by any foreign matter.

More specifically, the voltage defined by $\{R8/(R7+R8)\}V_{IGN}$ is added by the noninverting adding amplifier circuit 12 to the voltage delayed by the delay amplifier circuit 10 from the voltage waveform of the motor 7 for the time period T1, and the sum voltage is applied a positive input terminal of the comparator 13. A voltage reduced by the transistor TR15 for the time interval T2 from the time when the motor 7 has been started is applied to a negative input terminal of the comparator 13. The waveform shown by the solid line in FIGS. 4(D), (E) appears at a point D (positive input terminal) in FIG. 1, and the waveform shown by the dotted line in FIGS. 4(D), (E) appears at a point E (negative input terminal) in FIG. 1, the waveforms being shown superimposed for the sake of clarity.

The comparator 13 therefore compares the present motor voltage [with $\{R8/(R7+R8)\}V_{IGN}$ added] with the motor voltage which existed the time T1 prior to the present motor voltage. When the present motor voltage is lower than the prior motor voltage, the output of the comparator 13 is kept at a high level. When the present motor voltage is higher than the prior motor voltage, the output of the comparator 13 goes low at a time X to thereby determine that the motor 7 is locked.

Operation of the window glass has different modes including (A) automatic upward movement, (B) manual upward movement, (C) automatic downward movement, and (D) manual downward movement. These modes will be described one by one with reference to FIG. 3.

(A) Automatic upward movement:

When the automatic upward switch SW3 is closed, a base current flows through a resistor R37 to a transistor TR3 which is turned on. Then, a current flows from a relay coil RL1 to a diode D11 to a transistor TR3. With the relay coil RL1 energized, the motor 7 rotates in a normal direction to move the window glass upwardly.

At the same time, since the potential at the connection point between the diode D11 and the transistor TR3 is low, the base current of transistor TR7 flows through resistor R29 into transistor TR3. The collector current of transistor TR7 flows through resistor R31 and diode D13 into the base of transistor TR5. The transistor TR5 causes current to flow through relay coil RL1, diode D11, and the collector to emitter path of transistor TR5. Thus, the potential at the connection point common to diode D11 and the transistors TR3 and TR5 is kept low. Accordingly, the relay coil RL1 is kept energized by means of transistor TR3 even if the switch SW3 is turned off. Therefore, the motor 7 continues rotating to move the window glass continuously upward.

When the motor 7 is locked as the result of any foreign matter being caught between the window glass and the window frame during the upward movement of the window glass, the detection circuit 2 delivers a signal indicating the locked state. That is, because the output of comparator IC4 changes to "Low", the current of transistor TR14 is cut off and its collector is changed to "High". Transistor TR13, whose base is directly connected to the collector of transistor TR14 is turned on through resistor R27 and diode D15 so that its collector to emitter path is conducting. At this time, since the connection point between diode D15 and resistor R27 is directly connected to the collector of transistor TR7, the potential at the connection point is lowered further. Thus, the emitter potential of transistor TR7 is also lowered to a level close to ground level. Accordingly, the base potential of transistor TR5 is lowered such that its conducting state is no longer maintained, and as a result, this transistor is turned off to cut off the current to the relay coil RL1, thereby stopping the motor 7.

In this state, if the position detecting switch SW5 is ON (i.e. closed) because of a gap due to foreign matter caught between the window glass and the window frame, the electric charge of capacitor C2 which has been stored, as described hereinafter, is discharged through the path of transistor TR10, resistor R22, transistor TR11, position detecting switch SW5 and transistor TR6. This capacitor C2 is charged beforehand through the path including resistor R27, diode D17, and transistor TR9 while the transistor TR7 is conducting (namely, during the automatic upward movement of the window glass). Specifically, the base of the transistor TR9 is directly connected to the connection point between the emitter of transistor TR7 and resistor R31, and the path including resistor R27, base to emitter of transistor TR7 and resistor R23 is kept conducting while the transistor TR7 is ON, whereby the charging operation can take place.

When the transistor TR6 is turned on by the discharge of capacitor C2, current is supplied to relay coil RL2, the potential at the connection point between diode D12 and the collector of transistor TR6 is lowered, and the current of the base of transistor TR8 is caused to flow through the path including resistor R28, emitter to base of transistor TR8, resistor R30 and transistor TR6. Thus, transistor TR8 is conducting through the path including resistor R28, emitter to collector of transistor TR8, resistor R32, diode D14, and base to emitter of transistor TR6. Accordingly, the potential at the connection point between the collector of transistor TR6 and diode D12 is kept low. Hence, even when the discharging of capacitor C2 has ceased, the transistor TR6 continues to supply current to relay coil RL2. At this stage, because current is flowing into relay coil RL2 with relay coil RL1 non-energized, the motor 7 continues reverse rotation to lower the window glass. This state continues and is maintained until the latching action of the transistors TR8 and TR6 is removed, or until the window glass is fully opened.

(B) Manual upward movement:

When a manual upward switch SW1 is closed, a base current flows through a resistor R35 to a transistor TR1 to turn on the latter. A current then flows from the relay coil RL1 to the transistor TR1 to a diode D7 to thereby energize the relay coil RL1, whereupon the motor 7 is rotated in the normal direction to lift the window glass. When the switch SW1 is turned off, no current flows through the relay coil RL1, and hence the motor 7 and the window glass are stopped.

(C) Automatic downward movement:

When the automatic downward switch SW4 is closed, a base current flows through a resistor R38 to a transistor TR4 which is turned on. Then, a current flows from a relay coil RL2 to a diode D12 to a transistor TR4. With the relay coil RL2 energized, the motor 7 is reversed to move the window glass downwardly.

At the same time, a base current for the transistor TR8 flows through the transistor TR4, and a collector current from the transistor TR8 flows into the base of the transistor TR6, which is then energized to keep the relay coil RL2 energized. Therefore, the motor 7 continues rotating to move the window glass continuously downwardly even if the switch SW4 is turned off.

When the motor 7 is locked while the window glass moving downwardly, the detector 2 is enabled. The output from the comparator IC4 then goes low to energize the transistor TR13, whereupon the emitter potential of the transistor TR8 is lowered to a level close to a ground potential. The transistor TR8 and hence the transistor TR6 are now de-energized to cut off the current to the relay coil RL2, thus stopping the motor 7.

(D) Manual downward movement:

When a manual downward switch SW2 is closed, a base current flows through a resistor R36 to a transistor TR2 to turn on the latter. A current then flows from the relay coil RL2 to the transistor TR2 to a diode D8 to thereby energize the relay coil RL2, whereupon the motor 7 is reversed to lower the window glass. When the switch SW2 is turned off, no current flows through the relay coil RL2, and hence the window glass is stopped.

While in the above embodiment a motor voltage is measured as a motor characteristic value, the present invention is not limited to such an arrangement. Any locking condition of the motor may be detected on the basis of the measurement of a current or rotational speed of the motor.

While in the illustrated embodiment the detecting means comprises an analog circuit, the present invention is not limited to such an analog circuit arrangement. A motor lock may be detected to control the vertical movement of the window glass under the control of a microcomputer.

With the present invention, a measured motor characteristic value and another measured motor characteristic value slightly prior to the above motor characteristic value are compared to monitor the load condition of the motor. Therefore, the automatic window glass regulator can quickly detect any jam between the window glass and the window frame without being substantially affected by external conditions such as warpage of the window frame, a change in ambient temperature, and a discharge-induced voltage drop across the car-mounted battery. The automatic window glass regulator of the invention is accordingly safe in operation.

The motor can be started correctly to ensure the stable opening or closing operation of the window, since the switching circuit which is operationally associated with the operating switch cancels for an appropriate length of time the voltage signal which is produced when the motor is started.

Although a certain preferred embodiment has been shown and described, it should be understood that many changes and modifications may be made therein without departing from the scope of the appended claims.

What is claimed is:

1. A circuit for preventing the erroneous operation of a motor control device for lifting and lowering a power window having a drive motor for lifting and lowering the window glass, means for detecting when any foreign matter is caught between the window glass and a window frame when the window glass is lifted and lowered, said detecting means including sensor means for measuring a current characteristic value of said drive motor based on the load torque relative to supplied current and comparator means for comparing the present motor current characteristic value measured by said sensor means and a motor current characteristic value measured a predetermined of time before said present motor current characteristic value and providing a foreign matter detection signal if a difference value as the result of the comparison is greater than a predetermined range, and means for preventing the output of said foreign matter detection signal for a predetermined of time after the operation of an actuation switch for starting said drive motor.

2. In a device for controlling a motor for lifting and lowering a window glass automatically having means for detecting when any foreign matter is caught between the window glass and a window frame when the window glass is lifted, the improvement wherein said detector means includes a sensor for measuring a real-time first characteristic value of said motor based on an electric current supplied to said motor and for generating a first characteristic value signal, delay circuit means for generating a second characteristic value signal based upon said first characteristic value signal delayed by a predetermined time delay, starting condition cancelling means for cancelling said first characteristic value signal for a predetermined period of time associated with a starting condition when said motor is actuated, and comparator means for comparing said second characteristic value signal with said first characteristic value signal processed through said starting condition cancelling means and for generating a foreign matter signal if said first and second characteristic value signals have therebetween a difference which is greater than a predetermined range, whereby said comparator means is prevented from generating said foreign matter signal by said starting condition cancelling means for said predetermined period of time associated with said starting condition of said motor.

3. A device according to claim 2, wherein said motor characteristic value is a voltage value developed across said drive motor.

4. A device according to claim 2, including a latching circuit for keeping said motor energized in response to a signal from a switch and for releasing said motor from energization in response to the foreign matter signal from said comparator means.

5. A device according to claim 4, including a reversing circuit responsive to the foreign matter signal from said comparator means for enabling said latching circuit to reverse said motor.

* * * * *